US012670443B2

(12) United States Patent
Chijiwa et al.

(10) Patent No.: US 12,670,443 B2
(45) Date of Patent: Jun. 30, 2026

(54) OPTIMIZING MACHINE LEARNING MODELS USING BINARIZED PARAMETER MATRICES AND ITERATIVE RE-RANDOMIZATION

(71) Applicant: NTT, Inc., Tokyo (JP)

(72) Inventors: Daiki Chijiwa, Musashino (JP); Kenji Umakoshi, Musashino (JP); Tomohiro Inoue, Musashino (JP); Daigoro Yokozeki, Musashino (JP)

(73) Assignee: NTT, Inc., Tokyo (JP)

( * ) Notice: Subject to any disclaimer, the term of this patent is extended or adjusted under 35 U.S.C. 154(b) by 631 days.

(21) Appl. No.: 18/246,782

(22) PCT Filed: Sep. 28, 2020

(86) PCT No.: PCT/JP2020/036638
§ 371 (c)(1),
(2) Date: Mar. 27, 2023

(87) PCT Pub. No.: WO2022/064696
PCT Pub. Date: Mar. 31, 2022

(65) Prior Publication Data
US 2023/0359935 A1 Nov. 9, 2023

(51) Int. Cl.
*G06N 20/00* (2019.01)
*G06N 3/0495* (2023.01)
(52) U.S. Cl.
CPC .......... *G06N 20/00* (2019.01); *G06N 3/0495* (2023.01)

(58) Field of Classification Search
None
See application file for complete search history.

(56) References Cited

U.S. PATENT DOCUMENTS

2020/0110988 A1* 4/2020 Wang .................. G06N 3/0495

OTHER PUBLICATIONS

Ramanujan et al., What's Hidden in a Randomly Weighted Neural Network? arXiv.org, Mar. 31, 2020, retrieved from URL <https://arxiv.org/pdf/1911.13299.pdf>, 13 pages. (Year: 2020).*
Ramanujan et al., What's Hidden in a Randomly Weighted Neural Network? arXiv.org, Mar. 31, 2020, retrieved from URL <https://arxiv.org/pdf/1911.13299.pdf>, 13 pages.

* cited by examiner

*Primary Examiner* — Eric Nilsson
(74) *Attorney, Agent, or Firm* — Fish & Richardson P.C.

(57) ABSTRACT
A learning model optimization device includes a binarization matrix setting unit configured to set a binarization matrix m in which each element is a numerical value of "0" or "1" and a transformed matrix setting unit configured to set a transformed matrix M having, as an element, a product of each element of the parameter matrix and each element of the binarization matrix in the same row and the same column. The learning model optimization device further includes a learning unit configured to perform machine learning using the transformed matrix M and change a numerical value of each element of the binarization matrix m such that a result of the machine learning approaches teacher data, thereby optimizing the binarization matrix m, and a re-randomization processing unit configured to change again a parameter of the parameter matrix w.

6 Claims, 4 Drawing Sheets

OPTIMIZING MACHINE LEARNING MODELS USING BINARIZED PARAMETER MATRICES AND ITERATIVE RE-RANDOMIZATION

CROSS-REFERENCE TO RELATED APPLICATION

This application is a National Stage Application under 35 U.S.C. § 371 of International Application No. PCT/JP2020/036638, having an International Filing Date of Sep. 28, 2020.

The disclosure of the prior application is considered part of the disclosure of this application, and is incorporated by reference in its entirety into this application.

TECHNICAL FIELD

The present invention relates to a learning model optimization device, a learning model optimization method, and a learning model optimization program.

BACKGROUND ART

In deep learning, while learning can be performed with high accuracy, the number of parameters included in a learning model increases, which causes a problem that a period of time required for inference becomes longer and memory usage increases.

To address this problem, Non Patent Literature 1 proposes to achieve both improvement in learning accuracy and reduction in the number of parameters by fixing numerical values of parameters and performing pruning optimization, which is a method of pruning unnecessary parameters.

CITATION LIST

Non Patent Literature

Non Patent Literature 1: Vivek Ramanujan et al. (2020). What's Hidden in a RandomlyWeighted NeuralNetwork?. URL<https://arxiv.org/pdf/1911.13299.pdf>

SUMMARY OF INVENTION

Technical Problem

However, the pruning optimization method disclosed in Non Patent Literature 1 has a problem that learning accuracy of a learning model is low, and there has been an increasing demand for improving the learning accuracy of the learning model.

The present invention has been made in view of the above circumstances, and an object thereof is to provide a learning model optimization device, a learning model optimization method, and a learning model optimization program capable of shortening a period of time for inference and improving learning accuracy of a learning model.

Solution to Problem

A learning model optimization device according to one aspect of the present invention includes: a binarization matrix setting unit configured to set a binarization matrix having the same rows and the same columns as rows and columns of a parameter matrix of a learning model and in which each element is a numerical value of "0" or "1"; a transformed matrix setting unit configured to set a transformed matrix having, as an element, a product of each element of the parameter matrix and each element of the binarization matrix in the same row and the same column; a learning unit configured to perform machine learning using the transformed matrix and change a numerical value of each element of the binarization matrix such that a result of the machine learning approaches preset teacher data, thereby optimizing the binarization matrix; and a re-randomization processing unit configured to change again at least one element among the elements of the parameter matrix corresponding to an element having the numerical value of "0" among the elements of the transformed matrix, to a numerical value other than "0", in which the transformed matrix setting unit calculates a transformed matrix again using the parameter matrix after the element is changed by the re-randomization processing unit, and the learning unit performs machine learning again using the transformed matrix calculated again and changes a numerical value of each element of the binarization matrix again such that a result of the machine learning approaches the teacher, thereby optimizing the binarization matrix.

A learning model optimization method according to one aspect of the present invention includes: a step of setting a binarization matrix having the same rows and the same columns as rows and columns of a parameter matrix of a learning model and in which each element is a numerical value of "0" or "1"; a step of setting a transformed matrix having, as an element, a product of each element of the parameter matrix and each element of the binarization matrix in the same row and the same column; a step of performing machine learning using the transformed matrix and changing a numerical value of each element of the binarization matrix such that a result of the machine learning approaches preset teacher data, thereby optimizing the binarization matrix; a step of changing again at least one element among elements of the parameter matrix corresponding to an element having the numerical value of "0" among the elements of the transformed matrix, to a numerical value other than "0", a step of calculating a transformed matrix again using the parameter matrix after the element is changed; and a step of performing machine learning again using the transformed matrix calculated again and changing a numerical value of each element of the binarization matrix again such that a result of the machine learning approaches the teacher data, thereby optimizing the binarization matrix.

One aspect of the present invention is a learning model optimization program for causing a computer to function as the learning model optimization device described above.

Advantageous Effects of Invention

According to the present invention, it is possible to shorten a period of time for inference and improve learning accuracy of a learning model.

DESCRIPTION OF EMBODIMENTS

Configuration of Present Embodiment

Figure 1:
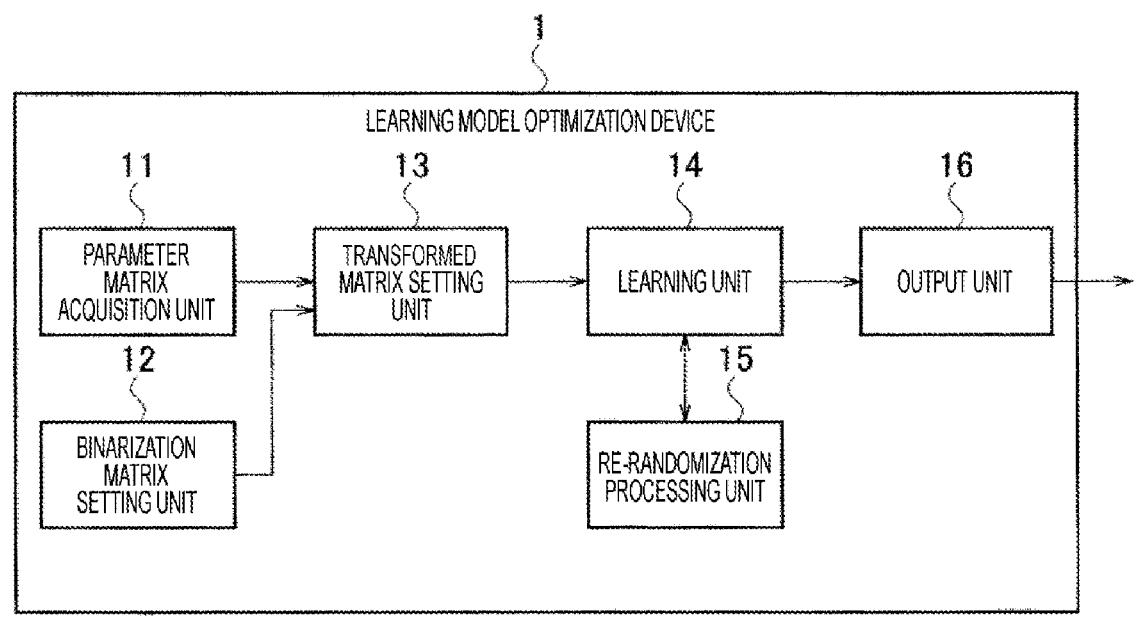
FIG. 1 is a block diagram illustrating a configuration of a learning model optimization device according to an embodiment of the present invention.
Figure 2:
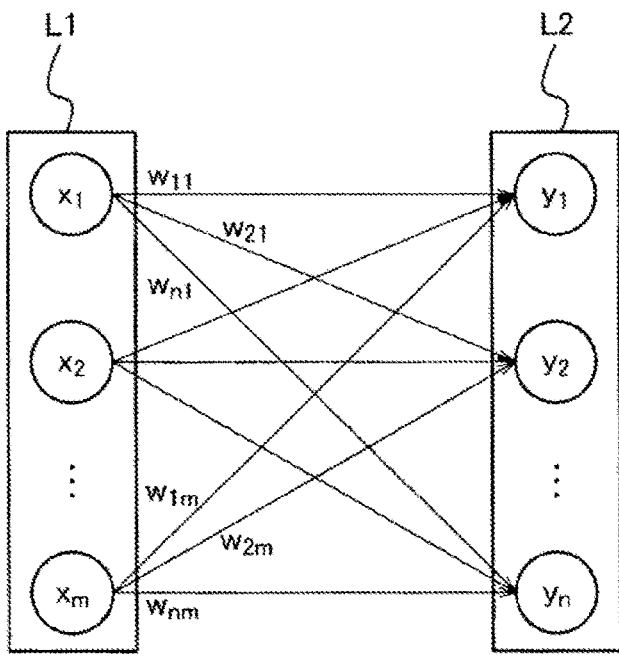
FIG. 2 is an explanatory diagram illustrating a first layer and a second layer included in a learning model and branches connecting nodes of the first layer and the second layer.

An embodiment of the present invention will be described below with reference to the drawings. FIG. 1 is a block diagram illustrating a configuration of a learning model optimization device 1 according to an embodiment of the present invention. FIG. 2 is an explanatory diagram illustrating a first layer L1 and a second layer L2 included in a learning model and branches connecting nodes of the first layer L1 and the second layer L2. The first layer L1 is, for example, an input layer or an intermediate layer of a neural network. The second layer L2 is, for example, an output layer or an intermediate layer of a neural network.

As illustrated in FIG. 2, the first layer L1 included in the learning model has a total of m nodes of x1, x2, . . . xm. The second layer L2 has a total of n nodes y1, y2, . . . , yn.

Each of the nodes x1 to xm of the first layer L1 and each of the nodes y1 to yn of the second layer L2 are connected by branches with parameters of wij (i=1 to n, j=1 to m). For example, a parameter of a branch connecting the node x1 and the node y1 is "w11". A parameter of a branch connecting the node xm and the node yn is "wnm".

As illustrated in FIG. 1, the learning model optimization device 1 according to the present embodiment includes a parameter matrix acquisition unit 11, a binarization matrix setting unit 12, a transformed matrix setting unit 13, a learning unit 14, a re-randomization processing unit 15, and an output unit 16.

The parameter matrix acquisition unit 11 acquires parameters of respective branches connecting the respective nodes x1 to xm included in the first layer L1 and the respective nodes y1 to yn included in the second layer L2. Assuming that the parameter of the branch connecting the nodes xi and yj is wij, the parameter matrix acquisition unit 11 acquires a parameter matrix w expressed by the following expression (1).

[Math. 1]

$$w = \begin{pmatrix} w_{11} & w_{12} & \cdots & w_{1m} \\ w_{21} & w_{22} & \cdots & w_{2m} \\ \vdots & \vdots & \ddots & \vdots \\ w_{n1} & w_{n2} & \cdots & w_{nm} \end{pmatrix} \tag{1}$$

In the following description, in order to simplify the description, it is assumed that the parameter matrix w is a matrix of three rows and three columns, that is, i=3 and j=3. The parameter matrix w can be expressed by the following expression (2).

[Math. 2]

$$w = \begin{pmatrix} w_{11} & w_{12} & w_{13} \\ w_{21} & w_{22} & w_{23} \\ w_{31} & w_{32} & w_{33} \end{pmatrix} \tag{2}$$

By the parameter matrix w, a relationship represented by the following expression (3) holds between the node yj (j=1 to 3) of the second layer L2 and the node xi (i=1 to 3) of the first layer L1.

[Math. 3]

$$\begin{pmatrix} y_1 \\ y_2 \\ y_3 \end{pmatrix} = \begin{pmatrix} w_{11} & w_{12} & w_{13} \\ w_{21} & w_{22} & w_{23} \\ w_{31} & w_{32} & w_{33} \end{pmatrix} \begin{pmatrix} x_1 \\ x_2 \\ x_3 \end{pmatrix} \tag{3}$$

Specifically, the following expression (3a) holds.

$$y1 = w11 \cdot x1 + w12 \cdot x2 + w13 \cdot x3$$

$$y2 = w21 \cdot x1 + w22 \cdot x2 + w23 \cdot x3$$

$$y3 = w31 \cdot x1 + w32 \cdot x2 + w33 \cdot x3 \tag{3a}$$

The binarization matrix setting unit 12 sets a matrix (hereinafter, referred to as a "binarization matrix m") having the same rows and the same columns as rows and columns of the parameter matrix w described above and in which each element is set to a numerical value of either "0" or "1". "0" and "1" included in the binarization matrix m can be randomly set. The binarization matrix has respective elements mij of i rows and j columns. Assuming that the parameter matrix w is a matrix of three rows and three columns, the binarization matrix m is a matrix of three rows and three columns, for example, as in the following expression (4).

[Math. 4]

$$m = \begin{pmatrix} 0 & 1 & 1 \\ 1 & 0 & 1 \\ 1 & 0 & 0 \end{pmatrix} \tag{4}$$

As understood from the expression (4), the binarization matrix m is a matrix in which each element of three rows and three columns is a numerical value of either "0" or "1". In a case of the above expression (4), the elements m11, m22, m32, and m33 included in the binarization matrix m are set to "0", and the other elements are set to "1".

The binarization matrix setting unit 12 also sets a compression rate q and sets the number of "0" and "1" such that a ratio between "0" and "1" among the respective elements becomes "(1−q):q". In other words, the binarization matrix setting unit 12 sets the number of "0" and "1" so that the ratio between "0" and "1" becomes constant. Note that the number of "0" and "1" may be randomly set without setting the compression rate q.

The transformed matrix setting unit 13 sets a matrix (hereinafter, referred to as a "transformed matrix") obtained by multiplying the parameter matrix w expressed by the above-described expression (2) by the binarization matrix m expressed by the expression (4) for each element.

For example, in a case where the parameter matrix w has parameters of three rows and three columns as in (2) described above, and the binarization matrix m has elements of three rows and three columns as in the expression (4), a product of each element of the parameter matrix w and each element of the binarization matrix m is calculated. In other words, the transformed matrix (referred to as "M") is expressed by the following expression (5).

[Math. 5]

$$M = \begin{pmatrix} w_{11} \cdot m_{11} & w_{12} \cdot m_{12} & w_{13} \cdot m_{13} \\ w_{21} \cdot m_{21} & w_{22} \cdot m_{22} & w_{23} \cdot m_{23} \\ w_{31} \cdot m_{31} & w_{32} \cdot m_{32} & w_{33} \cdot m_{33} \end{pmatrix} \quad (5)$$

As a result, for example, the transformed matrix M expressed by the following expression (6) is obtained. The transformed matrix M is stored in a memory (not illustrated), or the like. In this event, not only the numerical value of each element but also information on how the elements of the parameter matrix w and the elements of the binarization matrix m are multiplied is stored.

[Math. 6]

$$M = \begin{pmatrix} 0 & w_{12} & w_{13} \\ w_{21} & 0 & w_{23} \\ w_{31} & 0 & 0 \end{pmatrix} \quad (6)$$

As is clear from the above expression (6), regarding the numerical value of each element of the transformed matrix M, the numerical value of the element at a position corresponding to "0" of each element of the binarization matrix m is "0", and the numerical value of the element at a position corresponding to "1" is "wij", which is the original numerical value.

The learning unit 14 performs machine learning using the transformed matrix M set by the transformed matrix setting unit 13. Specifically, teacher data for each of the nodes y1, y2, and y3 of the second layer L2 is set, and the binarization matrix m is optimized so that numerical values of the nodes y1, y2, and y3 obtained by operation of the following expression (7) approach the teacher data. By performing machine learning, an optimal binarization matrix m can be obtained.

[Math. 7]

$$\begin{pmatrix} y_1 \\ y_2 \\ y_3 \end{pmatrix} = \begin{pmatrix} w_{11} \cdot m_{11} & w_{12} \cdot m_{12} & w_{13} \cdot m_{13} \\ w_{21} \cdot m_{21} & w_{22} \cdot m_{22} & w_{23} \cdot m_{23} \\ w_{31} \cdot m_{31} & w_{32} \cdot m_{32} & w_{33} \cdot m_{33} \end{pmatrix} \begin{pmatrix} x_1 \\ x_2 \\ x_3 \end{pmatrix} \quad (7)$$

The learning unit 14 also performs calculation of the transformed matrix M and machine learning for the binarization matrix m again using the new parameter matrix w in which the element of the parameter matrix w corresponding to the element set to "0" among the numerical values of the respective elements of the transformed matrix M has been changed to a random numerical value by the re-randomization processing unit 15 to be described later and acquires a more optimal binarization matrix m.

The re-randomization processing unit 15 performs processing (hereinafter, referred to as "re-randomization") of changing the element of the parameter matrix w corresponding to the element set to "0" among the elements of the binarization matrix m learned by the learning unit 14 to a random numerical value again. For example, it is assumed that an optimal binarization matrix m is obtained as a result of learning by the learning unit 14, and the transformed matrix M expressed in the expression (6), that is, the transformed matrix M in which each parameter of three rows and three columns is either "0" or "wij" is obtained by the binarization matrix m.

The re-randomization processing unit 15 performs processing of changing the element of the parameter matrix w corresponding to at least one of the elements set to "0" included in the transformed matrix M expressed in the expression (6) to a random numerical value. For example, the element w22 indicated by "p" in the following expression (8) is changed to a re-randomized numerical value.

[Math. 8]

$$w = \begin{pmatrix} w_{11} & w_{12} & w_{13} \\ w_{21} & \boxed{w_{22}} & w_{23} \\ w_{31} & w_{32} & w_{33} \end{pmatrix} \quad (8)$$

$$\lceil p \rfloor$$

When the parameter set to "0" is re-randomized, the re-randomization processing unit 15 sets a randomized numerical value R(wij) on the basis of the following expression (9).

$$R(wij)=\lambda \cdot wij + \mu \cdot v \quad (9)$$

Here, $\lambda$ is a coefficient of "$0<\lambda<1$", $\mu$ is a coefficient of "$0<\lambda<1$", and v is a numerical value indicated by Gaussian distribution.

Thus, a numerical value of "$\lambda \cdot w22 + \mu \cdot v$" is set to the element w22 indicated by "p" in the above-described expression (8). By the re-randomization, the parameter matrix w is changed to a new parameter matrix w' expressed by the following expression (10). The reason why re-randomization is performed using the Gaussian distribution is to suppress a rapid fluctuation of a numerical value of the calculation result.

[Math. 9]

$$w' = \begin{pmatrix} w_{11} & w_{12} & w_{13} \\ w_{21} & R_{(wij)} & w_{23} \\ w_{31} & w_{32} & w_{33} \end{pmatrix} \quad (10)$$

Note that while in the present embodiment, an example of re-randomizing one of the parameters set to "0" included in the transformed matrix M has been described, two or more parameters set to "0" may be re-randomized. In other words, the re-randomization processing unit 15 performs processing of changing at least one parameter to a numerical value other than "0" again.

Operation of Present Embodiment

Figure 3:
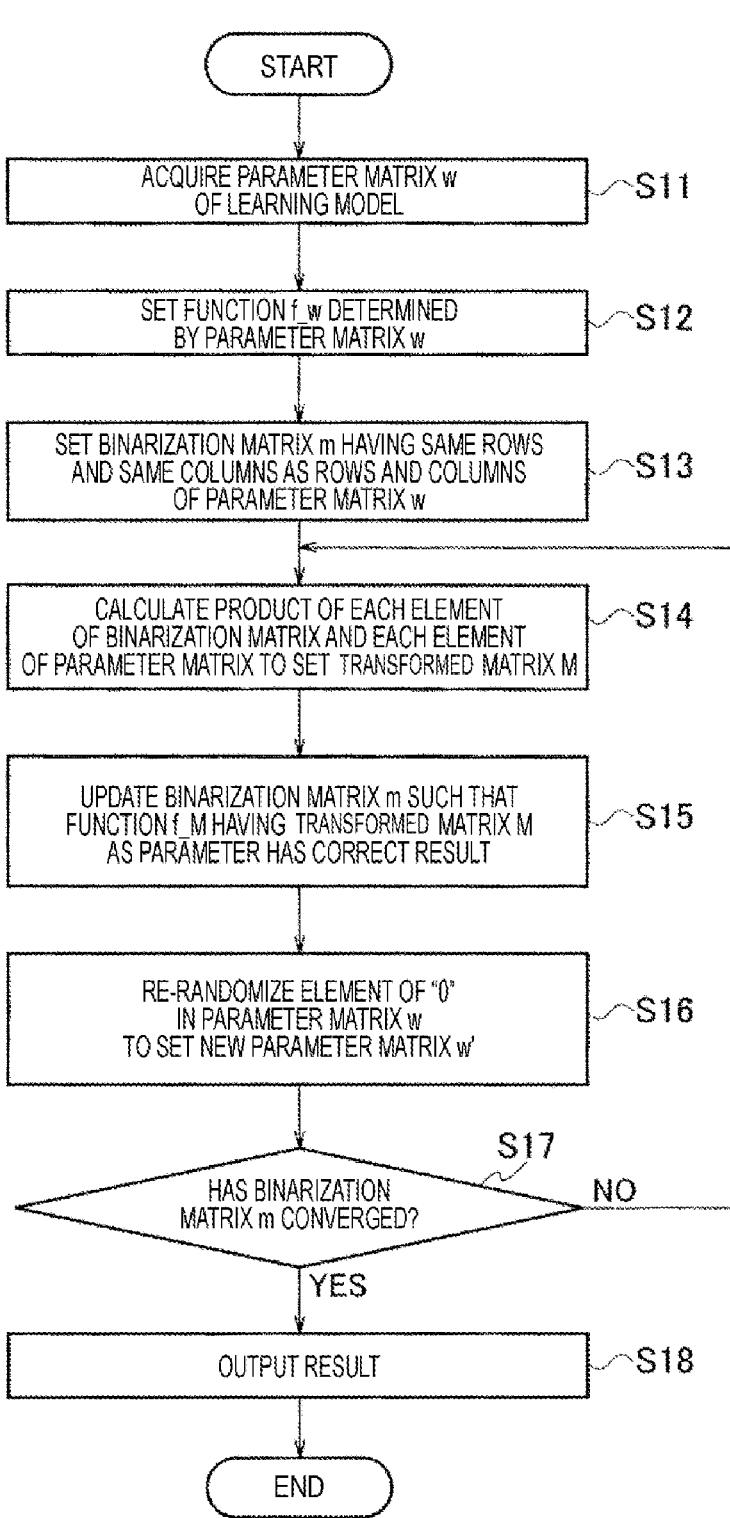
FIG. 3 is a flowchart illustrating processing procedure of the learning model optimization device according to the embodiment of the present invention.

Next, processing procedure of the learning model optimization device 1 according to the present embodiment will be described with reference to a flowchart illustrated in FIG. 3.

First, in step S11, the parameter matrix acquisition unit 11 acquires the parameter matrix w of the learning model. Specifically, as expressed in the above-described expression (1), the parameter matrix w including a plurality of elements wij of i rows and j columns is acquired.

In step S12, the parameter matrix acquisition unit 11 sets a function f_w determined by the parameter matrix w. Specifically, a function indicating a correspondence between "x1 to x3" and "y1 to y3" is set as the function f_w as expressed in the above-described expression (3).

In step S13, the binarization matrix setting unit 12 sets a binarization matrix m having the same rows and the same columns as rows and columns of the parameter matrix w. For example, in a case where the parameter matrix w is a matrix including parameters of three rows and three columns as expressed in the expression (2) described above, the binarization matrix m in which each element is "0" or "1" is set as expressed in the expression (4) described above. The element of "0" in the binarization matrix m is randomly set. Alternatively, a ratio between "0" and "1" is set in advance, and "0" and "1" are randomly set at this ratio.

In step S14, the transformed matrix setting unit 13 calculates a product of each element of the parameter matrix w and each element of the binarization matrix m. For example, in the binarization matrix m expressed in the expression (4) described above, the elements m11, m22, m32, and m33 are "0", "w11·m11=0", "w22·m22=0", "w32·m32=0", and "w33·m33=0", and w11, w22, w32, and w33 are "0". In other words, operation expressed in the above-described expression (5) is performed. As a result, the transformed matrix M expressed by the above-described expression (6) is obtained.

In step S15, the learning unit 14 performs machine learning so that the function f_M having the transformed matrix M as a parameter has a correct result and updates the binarization matrix m.

In step S16, the re-randomization processing unit 15 performs processing of re-randomizing the element for which the corresponding element in the binarization matrix m is "0" among the elements of the parameter matrix w. Specifically, the learning unit 14 calculates a numerical value R(wij) re-randomized according to the Gaussian distribution as expressed in the above-described expression (9). The re-randomization processing unit 15 also sets a matrix in which the specific element wij is changed to a re-randomized numerical value R(wij), that is, a matrix in which the element indicated by "p" in the expression (8) described above is changed to a numerical value R(wij) as a new parameter matrix w' (see the expression (10)) and calculates a product of the new parameter matrix w' and the binarization matrix m for each element to obtain a new transformed matrix M' (transformed matrix after parameter change). Then, machine learning is performed such that the function f_M' having the new transformed matrix M' as a parameter has a correct result, and the binarization matrix m is updated.

In step S17, the learning unit 14 determines whether or not the binarization matrix m has converged.

In a case where the binarization matrix m has converged (S17: Yes), in step S18, the output unit 16 outputs the binarization matrix m that has converged by the machine learning to an external device. Thereafter, the present processing ends. On the other hand, in a case where the binarization matrix m has not converged (S17: No), the processing returns to step S14.

Effects of Present Embodiment

In this way, the learning model optimization device 1 according to the present embodiment includes: a binarization matrix setting unit configured to set a binarization matrix having the same rows and the same columns as rows and columns of a parameter matrix of a learning model and in which each element is a numerical value of "0" or "1"; a transformed matrix setting unit configured to set a transformed matrix having, as an element, a product of each element of the parameter matrix and each element of the binarization matrix in the same row and the same column; a learning unit configured to perform machine learning using the transformed matrix and change a numerical value of each element of the binarization matrix such that a result of the machine learning approaches preset teacher data, thereby optimizing the binarization matrix; and a re-randomization processing unit configured to change again at least one element among the elements of the parameter matrix corresponding to an element in which the numerical value is "0" among the elements of the transformed matrix, to a numerical value other than "0", in which the transformed matrix setting unit calculates a transformed matrix again using the parameter matrix after the element is changed by the re-randomization processing unit, and the learning unit performs machine learning again using the transformed matrix calculated again and changes the numerical value of each element of the binarization matrix again such that a result of the machine learning approaches the teacher data, thereby optimizing the binarization matrix.

As described above, the learning model optimization device 1 according to the present embodiment performs machine learning to calculate an optimal binarization matrix m. Then, by changing an element at a position set to "0" in the binarization matrix m among the elements wij included in the parameter matrix w to "0", the pruning optimized transformed matrix M can be obtained.

Furthermore, among the elements wij included in the pruning optimized transformed matrix M, the element set to "0" is re-randomized to set a new parameter matrix w' and a transformed matrix M' obtained therefrom, and machine learning is performed using the transformed matrix M' to calculate a more optimal binarization matrix m. In other words, machine learning is performed by re-randomizing the element once set to "0", so that it is possible to promote new appearance of an effective parameter, expand a search space and eventually improve learning accuracy.

As described above, in the learning model optimization device 1 according to the present embodiment, by combining "pruning optimization" and "re-randomization", it is possible to shorten a period of time for inference and reduce memory usage while maintaining accuracy of the learning model. Specifically, the number of parameters can be reduced by about 20%, which results in shortening a period of time for inference and further reducing a memory amount by 20% or more.

Furthermore, re-randomization is performed by adding the Gaussian distribution to the parameter of the element set to "0" included in the parameter matrix w, so that it is possible to suppress a rapid change in the parameter and prevent failure in learning.

Note that while in the above-described embodiment, the example of re-randomizing the parameter wij using the Gaussian distribution has been described as expressed in the above-described expression (9), the present invention is not limited thereto, and re-randomization can be performed using a random number according to arbitrary probability distribution D. Even in a case where a random number according to arbitrary probability distribution D is used, it is possible to shorten a period of time for inference and improve learning accuracy of a learning model as in the above-described embodiment.

In addition, in the present embodiment, a ratio of "0" and "1" included in the binarization matrix is set to a constant ratio, so that it is possible to suppress a rapid change in the parameter.

Figure 4:
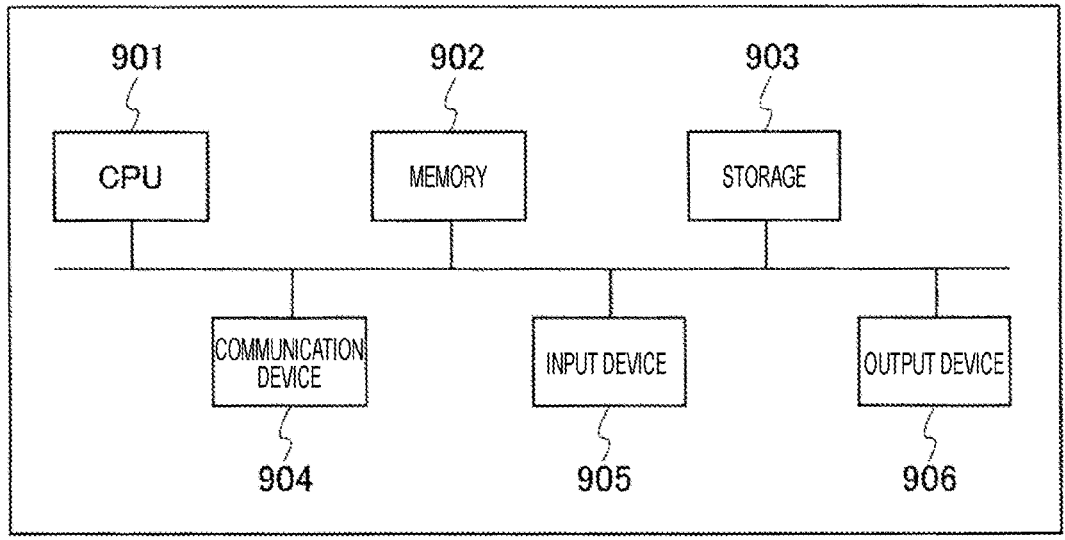
FIG. 4 is a block diagram illustrating a functional configuration of the learning model optimization device according to the present invention.

As illustrated in FIG. 4, for example, a general-purpose computer system including a central processing unit (CPU, processor) 901, a memory 902, a storage 903 (hard disk drive: HDD, solid state drive: SSD), a communication device 904, an input device 905, and an output device 906 can be used as the learning model optimization device 1 of the present embodiment described above. The memory 902 and the storage 903 are storage devices. In the computer system, by the CPU 901 performing a predetermined program loaded on the memory 902, each function of the learning model optimization device 1 is achieved.

Note that the learning model optimization device 1 may be implemented by one computer or may be implemented by a plurality of computers. Furthermore, the learning model optimization device 1 may be a virtual machine mounted on a computer.

Note that a program of the learning model optimization device 1 can be stored in a computer-readable recording medium such as an HDD, an SSD, a universal serial bus (USB) memory, a compact disc (CD), or a digital versatile disc (DVD), or can be distributed via a network.

Note that the present invention is not limited to the above-described embodiment, and various modifications can be made within the scope of the gist of the present invention.

REFERENCE SIGNS LIST

1 Learning model optimization device
11 Parameter matrix acquisition unit
12 Binarization matrix setting unit
13 Transformed matrix setting unit
14 Learning unit
15 Re-randomization processing unit
16 Output unit

The invention claimed is:

1. A learning model optimization device comprising:
a processor and memory storing instructions, wherein execution of the instructions causes the processor to perform operations comprising
providing a machine learning model comprising a first layer having a plurality of first nodes and a second layer having a plurality of second nodes, wherein the plurality of first nodes and the plurality of second nodes are connected by a plurality of branches associated with a parameter matrix, each branch corresponding to a respective parameter in the parameter matrix;
setting a binarization matrix having same rows and same columns as rows and columns of the parameter matrix and each element of the binarization matrix is a numerical value of "0" or "1";
setting a transformed matrix having, as an element, a product of each element of the parameter matrix and each element of the binarization matrix in a same row and a same column;
performing machine learning for training the machine learning model using the transformed matrix and changing a numerical value of each element of the binarization matrix such that a result of the machine learning approaches preset training data, thereby optimizing the binarization matrix; and
changing an element among elements of the parameter matrix corresponding to an element having a numerical value of "0" among the elements of the transformed matrix, to a numerical value other than "0",
recalculating the transformed matrix using the changed parameter matrix, and
performing the machine learning for training the machine learning model using the recalculated transformed matrix and changing the numerical value of each element of the binarization matrix such that the result of the machine learning approaches the preset training data, thereby optimizing the binarization matrix.

2. The learning model optimization device according to claim 1, wherein changing the element of the parameter matrix to the numerical value other than "0" comprises adding a random number according to Gaussian distribution.

3. The learning model optimization device according to claim 1, wherein changing the element of the parameter matrix to the numerical value other than "0" is based on a random number according to arbitrary probability distribution.

4. The learning model optimization device according to claim 1, wherein setting the binarization matrix comprising setting a ratio of "0" and "1" included in the binarization matrix to a constant ratio.

5. A learning model optimization method comprising:
providing a machine learning model comprising a first layer having a plurality of first nodes and a second layer having a plurality of second nodes, wherein the plurality of first nodes and the plurality of second nodes are connected by a plurality of branches associated with a parameter matrix, each branch corresponding to a respective parameter in the parameter matrix;
setting a binarization matrix having same rows and same columns as rows and columns of the parameter matrix and each element of the binarization matrix is a numerical value of "0" or "1";
setting a transformed matrix having, as an element, a product of each element of the parameter matrix and each element of the binarization matrix in a same row and a same column;
performing machine learning for training the machine learning model using the transformed matrix and changing a numerical value of each element of the binarization matrix such that a result of the machine learning approaches preset training data, thereby optimizing the binarization matrix;
changing an element among elements of the parameter matrix corresponding to an element having a numerical value of "0" among the elements of the transformed matrix, to a numerical value other than "0";
recalculating the transformed matrix using the changed parameter matrix; and
performing the machine learning for training the machine learning model using the recalculated transformed matrix and changing the numerical value of each element of the binarization matrix such that the result of the machine learning approaches the preset training data, thereby optimizing the binarization matrix.

6. A non-transitory computer-readable storage medium storing a program, wherein executing of the program causes a computer to function as the learning model optimization device according to claim 1.

* * * * *